United States Patent
Maienschein et al.

(10) Patent No.: US 8,579,093 B2
(45) Date of Patent: Nov. 12, 2013

(54) HYDRODYNAMIC TORQUE CONVERTER

(75) Inventors: Stephan Maienschein, Baden-Baden (DE); Peter Droll, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/584,433

(22) Filed: Aug. 13, 2012

(65) Prior Publication Data

US 2012/0305358 A1    Dec. 6, 2012

Related U.S. Application Data

(63) Continuation of application No. PCT/DE2011/000104, filed on Feb. 4, 2011.

(30) Foreign Application Priority Data

Feb. 16, 2010  (DE) .................... 10 2010 008 178
Mar. 11, 2010  (DE) .................... 10 2010 011 139

(51) Int. Cl.
*F16H 45/02* (2006.01)

(52) U.S. Cl.
USPC ...... 192/3.28; 74/574.2; 192/30 V; 192/213.2

(58) Field of Classification Search
USPC .......................................... 60/338; 74/574.2
See application file for complete search history.

(56) References Cited

U.S. PATENT DOCUMENTS

| | | | |
|---|---|---|---|
| 6,026,940 A | 2/2000 | Sudau | |
| 6,244,401 B1 * | 6/2001 | Maienschein et al. | 192/3.3 |
| 2010/0236228 A1 * | 9/2010 | Degler et al. | 60/338 |
| 2010/0242466 A1 | 9/2010 | Krause et al. | |

FOREIGN PATENT DOCUMENTS

| | | |
|---|---|---|
| DE | 19804227 | 8/1999 |
| DE | 10 2008 057 648 A1 * | 6/2009 |
| DE | 102008057647 | 6/2009 |

* cited by examiner

*Primary Examiner* — Rodney Bonck
(74) *Attorney, Agent, or Firm* — Simpson & Simpson, PLLC

(57) ABSTRACT

A hydrodynamic torque converter comprising a torque converter lockup clutch and a converter housing connected at the drive side, and a pump wheel non-rotatably connected thereto, as well as a turbine wheel non-rotatably connected at the output side to an output hub, and a torsional vibration damper actively arranged between the clutch output of the torque converter lockup clutch and the output hub, and comprising a centrifugal pendulum device arranged within the converter housing and having a pendulum flange with slightly swiveling pendulum masses thereupon, wherein the pendulum flange is arranged axially between the torsional vibration damper and the turbine wheel and is non-rotatably connected to the turbine wheel and the output hub by means of a keyed connection.

13 Claims, 5 Drawing Sheets

HYDRODYNAMIC TORQUE CONVERTER

CROSS-REFERENCE TO RELATED APPLICATIONS

This application is filed under 35 U.S.C. §120 and §365(c) as a continuation of international Patent Application No. PCT/DE2011/000104 filed Feb. 4, 2011, which application claims priority of German Patent Application Nos. DE 10 2010 008 178.7, filed Feb. 16, 2010 and. DE 10 2010 011 139.2, filed Mar. 11, 2010, which applications are incorporated herein by reference in their entireties.

FIELD OF THE INVENTION

The invention relates to torque converters, and, more specifically to a hydrodynamic torque converter.

BACKGROUND OF THE INVENTION

Hydrodynamic torque converters can, for example, be arranged in a drivetrain of a motor vehicle for transmitting torque between an internal combustion engine and a transmission.

Such hydrodynamic torque converters can be driven with a pump wheel connected at the drive side that causes fluid to flow toward a turbine wheel connected to the output side. Before the fluid flows from the turbine wheel back into the pump wheel, it passes through a guide wheel and, in certain situations, undergoes a change in the direction of flow which influences the torque transmitted between the pump wheel and the turbine wheel.

It is also known to arrange a torque converter lockup clutch to bypass the hydrodynamic torque transmission caused by the fluid. The lockup clutch optionally connects the drive side, for example the converter housing non-rotatably connected to the pump wheel, to an output side, for example in the form of an output hub connectable to a transmission input shaft by means of interlocking. in such situations, fluctuations in torsion caused by an internal combustion engine connected to the converter housing can be transmitted to the output hub. To dampen torsional vibrations, a torsional vibration damper is normally actively arranged in the flow of force between the clutch output of the converter lockup clutch and the output hub. Given certain circumstances and requirements on the hydrodynamic torque converter, the damping properties of the torsional vibration damper are insufficient. A centrifugal pendulum device can be arranged within the converter housing to improve the damping properties of the hydrodynamic torque converter.

BRIEF SUMMARY OF THE INVENTION

The present invention broadly comprises a torque converter lockup clutch and a converter housing connected at the drive side, and a pump wheel non-rotatably connected thereto, as well as a turbine wheel non-rotatably connected at the output side to an output hub, and a torsional vibration damper actively arranged between the clutch output of the torque converter lockup clutch and the output hub, and comprising a centrifugal pendulum device arranged within the converter housing and having a pendulum flange with slightly swiveling pendulum masses thereupon, wherein the pendulum flange is arranged axially between the torsional vibration damper and the turbine wheel and is non-rotatably connected to the turbine wheel and the output hub by means of a keyed connection.

The object of the invention is to improve the connection of the centrifugal pendulum device in the hydrodynamic torque converter.

Accordingly, a hydrodynamic torque converter is disclosed that includes a torque converter lockup clutch and a converter housing connected at the drive side. A pump wheel is non-rotatably connected to the converter housing, a turbine wheel is non-rotatably connected at the output side to an output hub, and a torsional vibration damper is actively arranged between the clutch output of the torque converter lockup clutch and the output hub. A centrifugal pendulum device is arranged within the converter housing having a pendulum flange with slightly swiveling pendulum masses. The pendulum flange is arranged axially between the torsional vibration damper and the turbine wheel and is non-rotatably connected to the turbine wheel and the output hub by means of a keyed connection, for example by means of a rivet element. This can improve the connection between the pendulum flange and turbine wheel as well as the drive hub and give it a more economical design.

The torsional vibration damper can be designed as a sequential damper having first and second sequentially effective energy storage elements. The first energy storage elements are effectively arranged between a damper input part and an intermediate damper part, and the second energy storage elements are effectively arranged between the intermediate damper part and damper output part. it is also conceivable to design the torsional vibration damper as a single damper with a damper output part that can be pivoted slightly in relation to a damper input part under the effect of the energy storage elements.

In an embodiment of the invention, the damper output part of the torsional vibration damper is non-rotatably connected to the output hub, preferably by means of an interlock. The interlock can be designed to produce axial play of movement between the damper output part and the output hub.

In another embodiment of the invention, the damper output part is non-rotatably connected to a component having a pendulum flange, or the turbine wheel, or the output hub, and is especially riveted. A first rivet element preferably creates a connection between the pendulum. flange and turbine wheel and output hub, and a second rivet element creates a connection between the damper output part and one of the components. Preferably, the first and second rivet elements are arranged on different radii.

In another embodiment of the invention, the pendulum flange and the damper output part have tabs pointing radially inward that are arranged alternatingly on the perimeter in the area of the first rivet element for accommodating the first and second rivet elements. A tab of the pendulum flange is connected to the turbine wheel at one peripheral position, and a tab of the damper output part is connected to the turbine wheel at another peripheral position. The first and second rivet elements are preferably arranged essentially on a common radius. The thickness of the compound structure consisting of the pendulum flange and turbine wheel as well as the damper output part and turbine wheel can be essentially the same size on the perimeter in the area of the rivet elements. In particular, the thickness of the component and the thickness of the tab arranged thereupon can be different or equivalent. The thickness of the component outside of the area of the rivet connection can he designed to be independent or dependent on the thickness of the tab. For example, the thickness in the area of the tab can be less than that of the component belonging to the tab, or vice versa. An unchanging thickness of the perimeter of the compound structure can be achieved either by the pendulum flange and turbine wheel, or the damper output part and turbine wheel. Ideally, the tabs are designed to be integral with the respective component.

In another embodiment of the invention, the turbine wheel is riveted to the pendulum flange and output huh by means of a spacing bolt, and the damper output part is at an axial distance from this compound structure and is fastened thereto by means of a spacing bolt.

Additional advantages and advantageous embodiments of the invention are found in the description and figures that, for the sake of clarity, are not reproduced true to scale. All of the explained features can be used in the indicated combination as well as other combinations or by themselves without departing from the scope of the invention.

BRIEF DESCRIPTION OF THE DRAWINGS

The invention will be further explained in detail with reference to the accompanying figures, in which.

DETAILED DESCRIPTION OF THE INVENTION

Figure 1:
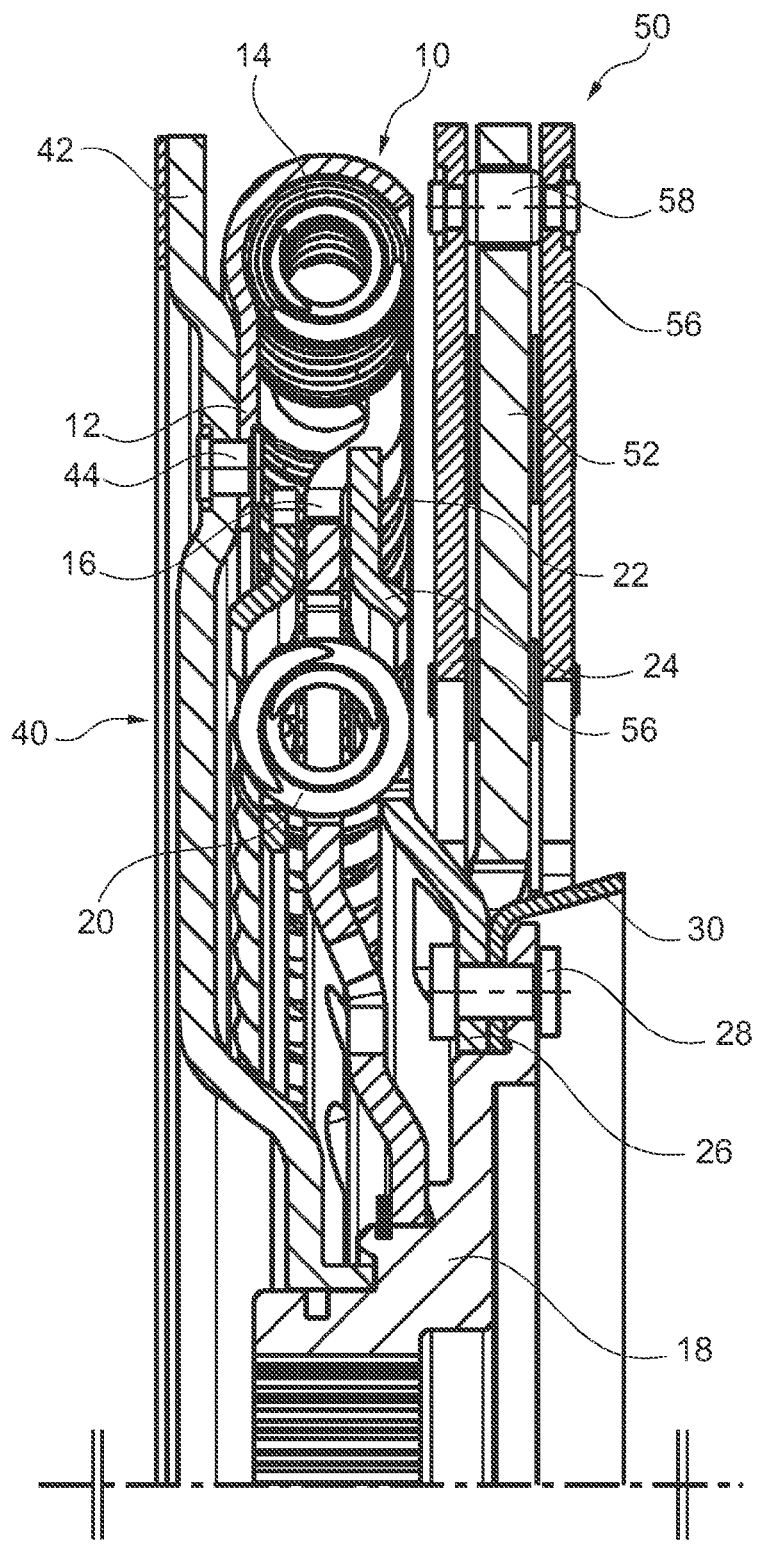
FIG. 1 is a cross-sectional view of a section of a hydrodynamic torque converter in an exemplary embodiment of the invention.

FIG. 1 shows a section of a hydrodynamic torque converter in an exemplary embodiment of the invention. The section basically shows torsional vibration damper 10 and centrifugal pendulum device 50 arranged within a converter housing and designed as a sequential damper. Damper input part 12 of torsional vibration damper 10 is connected to clutch output 42 of torque converter lockup clutch 40 that is non-rotatably connected by means of rivet element 44. Damper input part 12 is connected by means of first energy storage elements 14 lying radially on the outside to damper intermediate part 16 that is slightly pivotable in relation to damper input part 12. Damper input part 12 encloses first energy storage elements 14, such as bow springs, to secure them radially and axially. On a first peripheral side, first energy storage elements 14 are contacted by damper input part 12, and their transference of force to a second peripheral side end of first energy storage elements 14 can be tapped by a contact element affixed to intermediate damper part 16. Intermediate damper part 16 is designed as a disk-like part and is rotatably accommodated and centered radially to the inside on output hub 18 that is connectable to a transmission input shaft by means of teeth. Intermediate damper part 16 is in turn actively connected by means of second energy storage elements 20, such as pressure springs, to damper output part 22 comprising two neighboring disk parts that accommodate intermediate damper part 16 between them.

Figure 2:
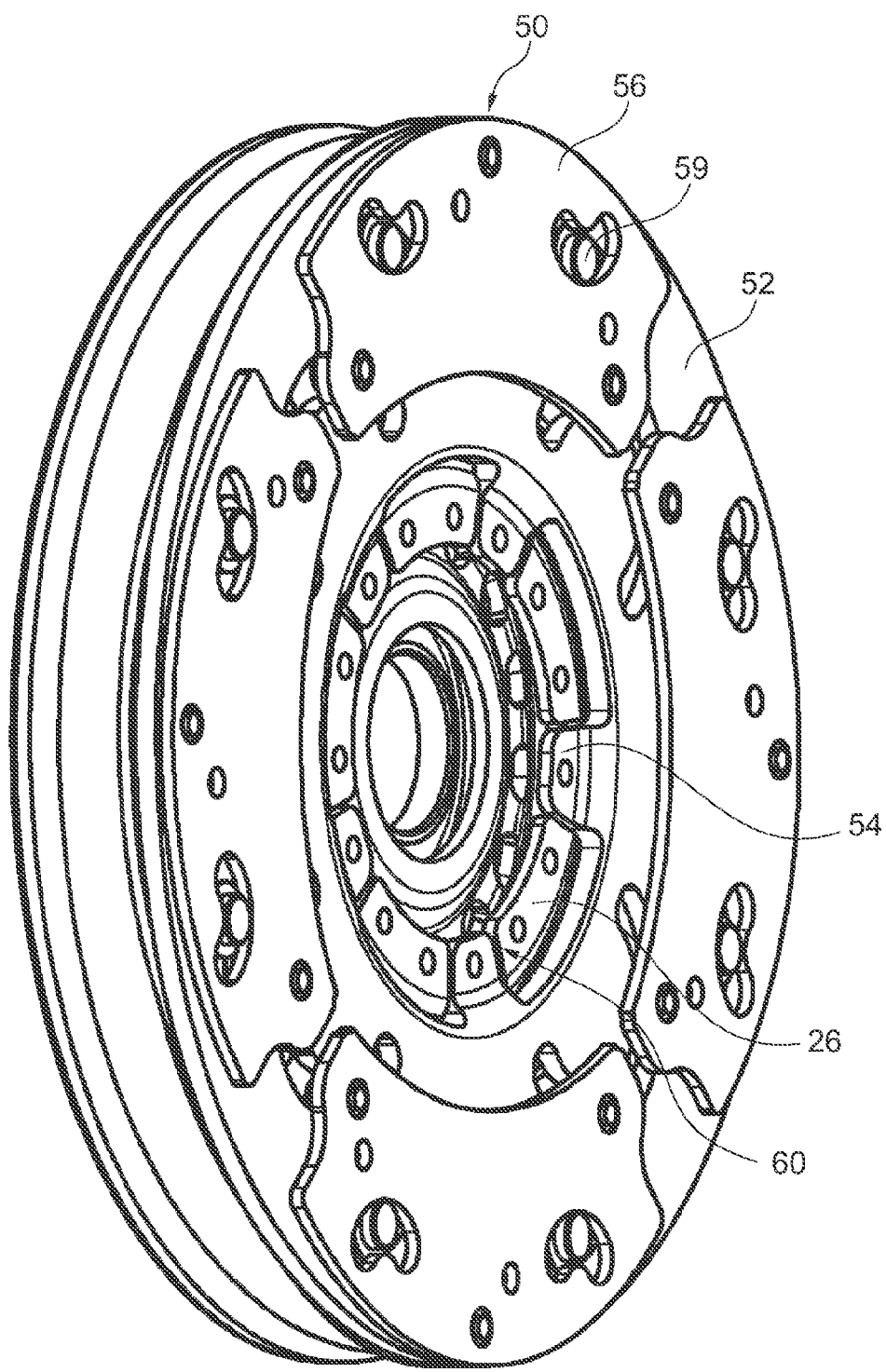
FIG. 2 is a three-dimensional view of the section shown in FIG. 1, but without a turbine wheel.

Disk part 24 closest to turbine wheel 30 of the hydrodynamic torque converter has integrally formed tabs 26 extending radially inward that have a through-hole for receiving rivet element 28 for fastening disk part 24 to turbine wheel 30 and output huh 18. As can be seen in FIG. 2, pendulum flange 52 of centrifugal pendulum device 50 also has tabs 54 that extended radially inward alternately arranged peripherally with tabs 26 of disk part 24 to receive an additional rivet element. This rivet element serves to fasten pendulum flange 52 to turbine wheel 30 and output hub 18. Tab 54 of pendulum flange 52 and tab 26 of disk part 24 are shaped and have a corresponding thickness such that substantially flat contact surface 60 results for connecting turbine wheel 30 on the side facing turbine wheel 30. The thickness of tabs 26, 54 can be different from the thickness of respective components 24, 52. On the side of turbine wheel 30 axially opposite tabs 26, 54, the turbine wheel is connected to output hub 18 by means of rivet element 28. The thickness of the respective compound structure consisting of tabs 26, 54 and turbine wheel 30 as well as output huh 18 is substantially the same in the area of the rivet element 28. Among other things, this has the advantage that equally long rivet elements 28 distributed on the perimeter can be used.

Pendulum flange 52 is basically designed as a disk-shaped part and extends axially neighboring torsional vibration damper 10, wherein pendulum flange 52 accommodates pendulum masses 56 arranged on both sides in an area radially to the outside. Pendulum masses 56 are attached to each other by means of spacing bolts 58 and can pivot slightly in relation to pendulum flange 52 along cutouts in pendulum flange 52. Pendulum masses 56 can roll in relation to pendulum flange 52 by means of rolling elements 59 in cutouts of pendulum masses 56 and pendulum flange 52 to generate a pendulum motion.

Figure 3:
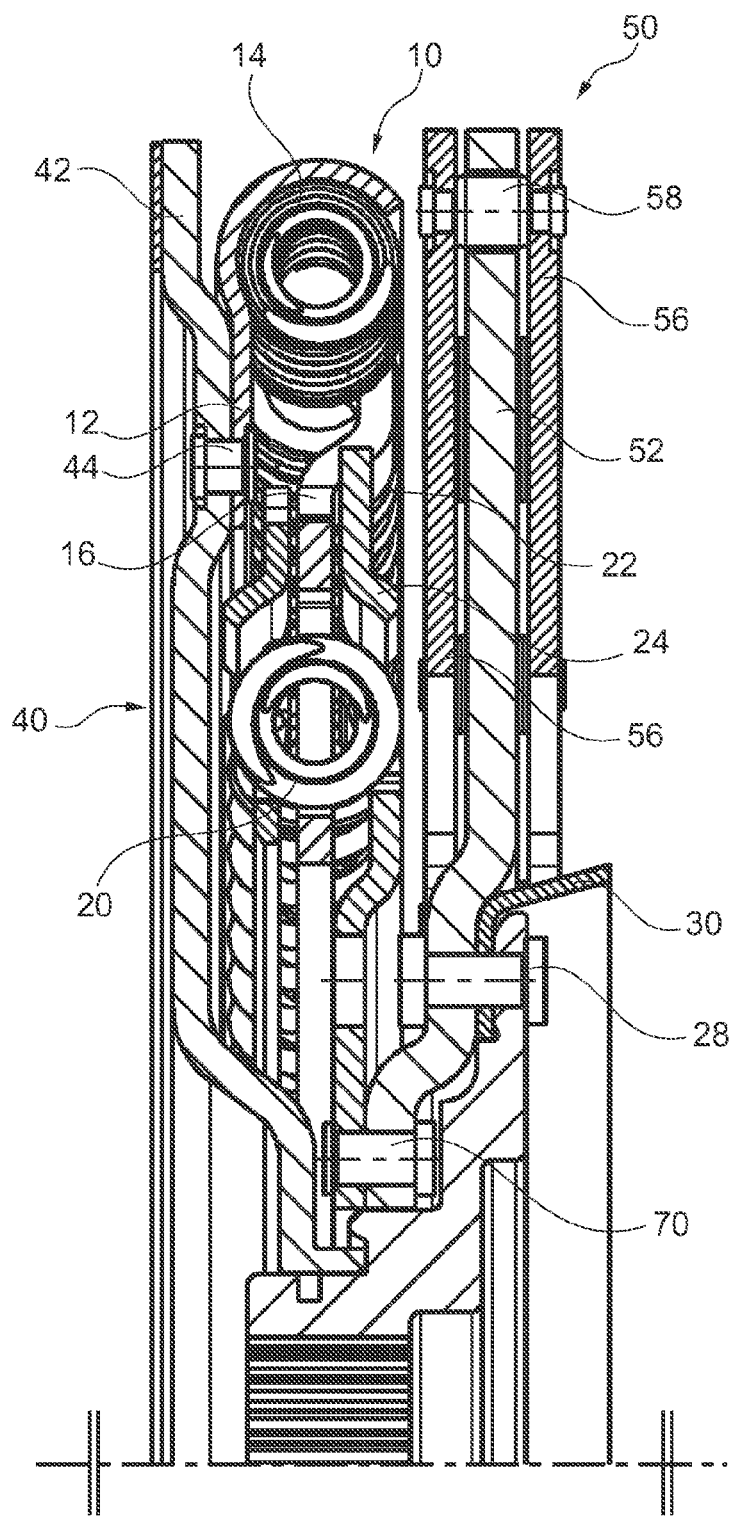
FIG. 3 is a cross-sectional view of a section of a hydrodynamic torque converter in another exemplary embodiment of the invention.

FIG. 3 shows a section of a hydrodynamic torque converter in another exemplary embodiment of the invention. This embodiment is designed similar to that in FIG. 1 and FIG. 2, with the basic difference that the intermediate damper part ends radially further to the outside than disk part 24 of damper output part 22, wherein the latter is accommodated centered on output hub 18. In addition, pendulum flange 52 extends radially further inward and is also arranged centered on output hub 18. Radially outside of the output hub, disk part 24 and pendulum flange 52 are connected to each other by means of rivet element 70. Radially further to the outside, pendulum flange 52 is connected to turbine wheel 30 and the output hub by means of another rivet element 28. By using two rivet elements 28, 70 arranged on a different radius to fasten the components to each other, the overall thickness of the compound structure consisting of disk part 24, pendulum flange 52, turbine wheel 30 and output hub 18 can be reduced in the area of the rivet connection.

Figure 4:
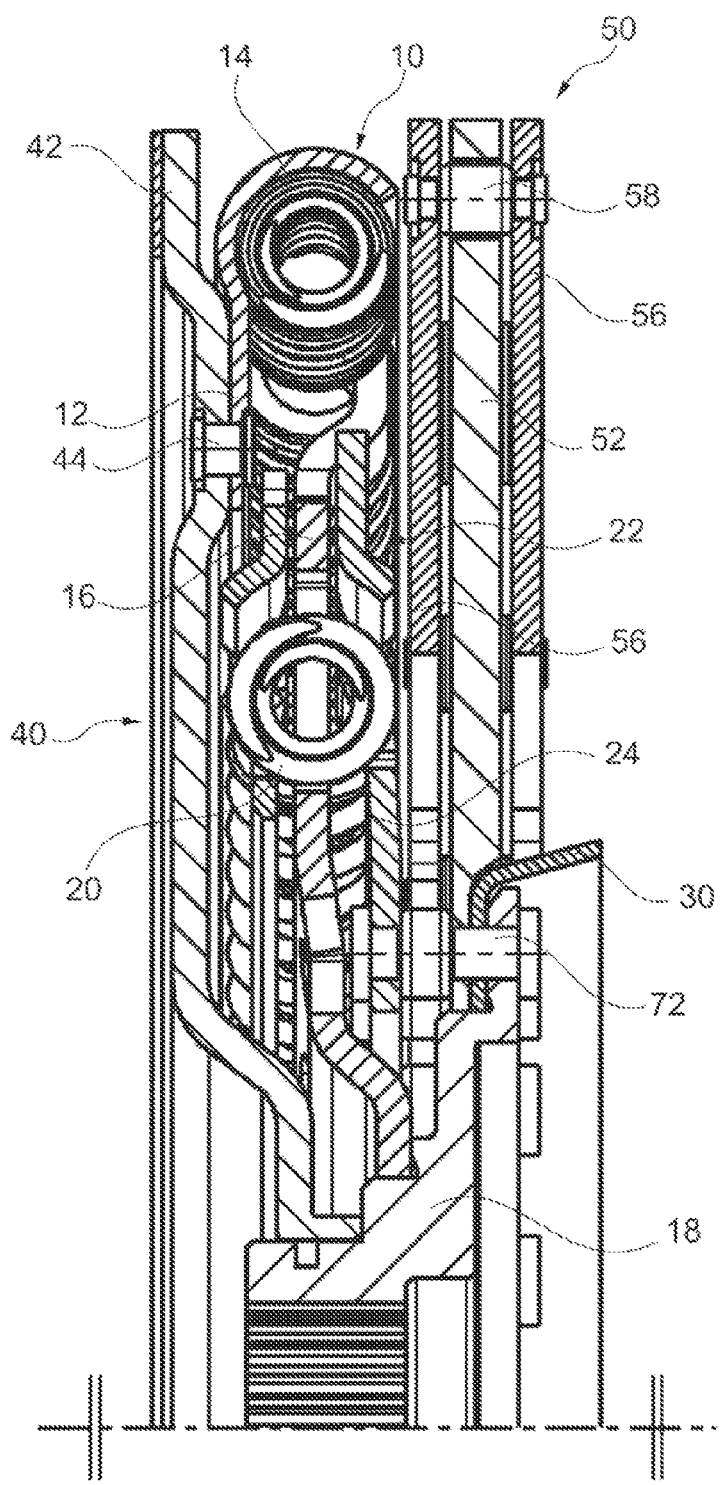
FIG. 4 is a cross-sectional view of a section of a hydrodynamic torque converter in another exemplary embodiment of the invention; and, FIG. 5 is a cross-sectional view of a section of a hydrodynamic torque converter in another exemplary embodiment of the invention.

FIG. 4 shows a section of a hydrodynamic torque converter in another exemplary embodiment of the invention. Similar to the embodiment in FIG. 1, intermediate damper part 16 is accommodated centered on output huh 18 and is rotatable in relation thereto. Disk part 24 of damper output part 22 is non-rotatably attached by means of a spacing bolt 72 at an axial distance to pendulum flange 52. Spacing bolt 72, in its additional function as a rivet element, also fastens pendulum flange 52 to directly neighboring turbine wheel 30 and output hub 18. By arranging the components in this manner, the overall thickness of components 30, 18, 52 can be reduced in the area of the spacing bolts that are riveted to each other in a compound structure.

Figure 5:
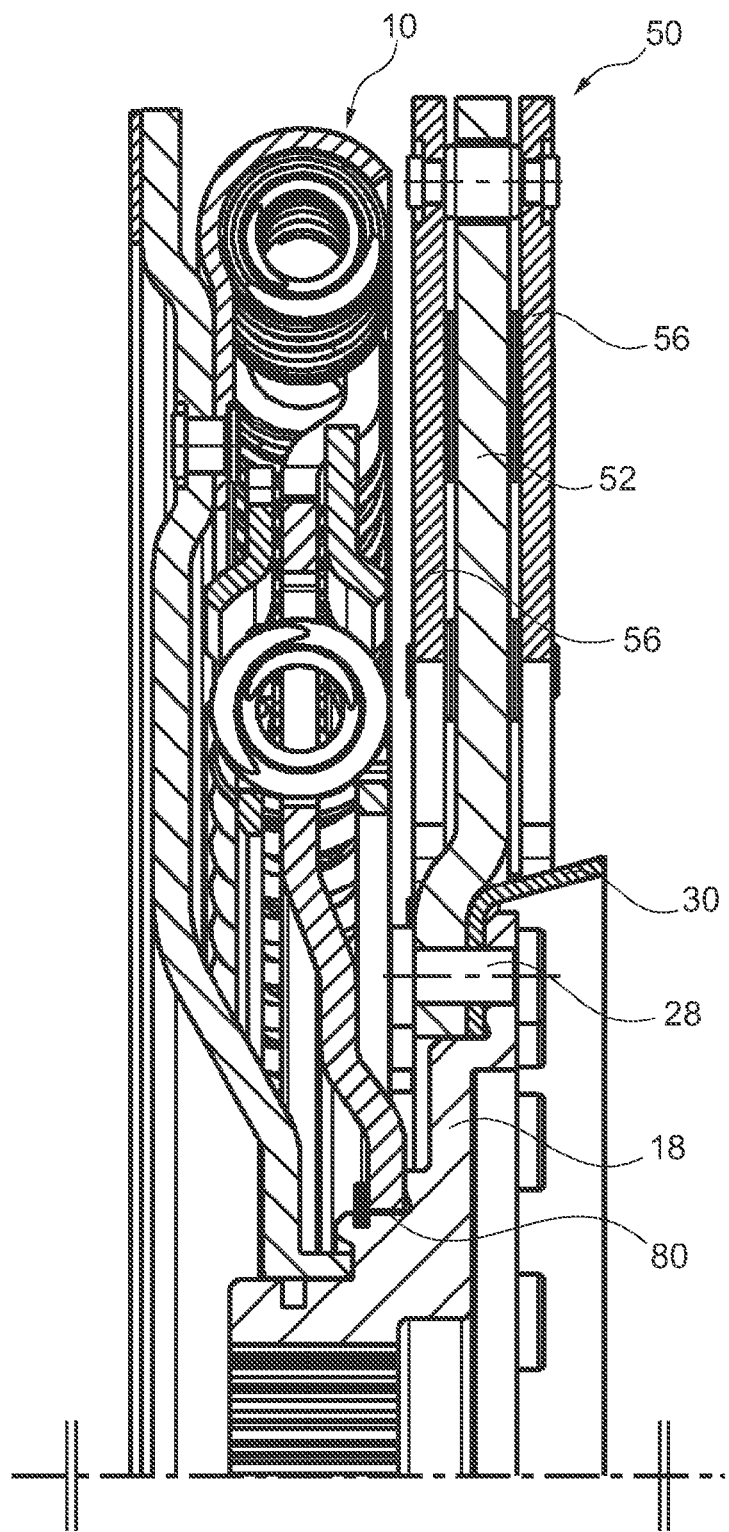

FIG. 5 shows a section of a hydrodynamic torque converter in another exemplary embodiment of the invention. Disk part 24 of damper output part 22 is connected by means of interlock 80 to output huh 18. Instead of the interlock, another connecting method can be provided such as press-fitting or welding damper output part 22 to output hub 18. Pendulum flange 52 is non-rotatably connected by means of rivet element 28 to turbine Wheel 30 and output hub 18.

LIST OF REFERENCE CHARACTERS

10 Torsional vibration damper
12 Damper input part
14 Energy storage element
16 Intermediate damper part
18 Output hub
20 Energy storage element
22 Damper output part
24 Disk part
26 Tab
28 Rivet element
30 Turbine wheel
40 Torque converter lockup clutch
42 Clutch output
44 Rivet element
50 Centrifugal pendulum device
52 Pendulum flange
54 Tab
56 Pendulum mass
58 Spacing bolts
59 Rolling element
60 Contact surface
70 Rivet element
72 Spacing Bolt
80 Gearing

What is claimed is:

1. A hydrodynamic torque converter, comprising:
a torque converter lockup clutch (40);
a converter housing connected at a drive side;
a pump wheel non-rotatably connected to the converter housing;
a turbine wheel (30) non-rotatably connected at an output side to an output hub (18); and,
a torsional vibration damper (10) having a damper output part (22) non-rotatable connected to the output hub (18) or a component selected from the group consisting of a pendulum flange, said turbine wheel, and said output hub, and said torsional vibration damper (10) actively arranged between a clutch output (42) of the torque converter lockup clutch (40) and the output hub (18), and comprising:
at least one spring; and
a centrifugal pendulum device (50) arranged within the converter housing and having a pendulum flange (52) with a plurality of slightly swiveling pendulum masses (56) thereupon, wherein:
the pendulum flange (52) is arranged axially between the torsional vibration damper (10) and the turbine wheel (30) and is non-rotatably connected to the turbine wheel (30) and the output hub (18) by means of a keyed connection (28) having a first rivet element to connect the pendulum flange to the turbine wheel and the output hub, and a second rivet element to connect the damper output part and the component; and
at least a portion of the plurality of pendulum masses is aligned with the at least one spring in a direction parallel to an axis of rotation for the torque converter.

2. The hydrodynamic torque converter as recited in claim 1, wherein the damper output part is connected to the output hub by means of an interlock.

3. The hydrodynamic torque converter as recited in claim 1 wherein the damper output part is non-rotatably connected to said component by a rivet.

4. The hydrodynamic torque converter as recited in claim 1, wherein the first and second rivet elements (28, 70) are arranged on different radii.

5. The hydrodynamic torque converter as recited in claim 1, wherein the pendulum flange (52) and the damper output part (22) have alternately arranged tabs (26, 54) directed radially inward on the perimeter to accommodate the first and second rivet elements (28, 70), wherein a tab (54) of the pendulum flange (52) is connected to the turbine wheel (30) at one peripheral position, and a tab (26) of the damper output part (22) is connected to the turbine wheel (30) at a different peripheral position.

6. The hydrodynamic torque converter as recited in claim 5, wherein the first and second rivet elements (28, 70) are arranged substantially on a common radius.

7. The hydrodynamic torque converter as recited in claim 5, wherein the thickness of a compound structure comprising the pendulum flange (52), the turbine wheel (30), and the damper output part (22) and output hub (18) are basically the same size on the perimeter in the area of the rivet elements (28, 70).

8. The hydrodynamic torque converter as recited in claim 5, wherein the thickness of the component and thickness of the tab (26, 54) arranged thereupon are different.

9. The hydrodynamic torque converter as recited in claim 5, wherein the thickness of the component and thickness of the tab (26, 54) arranged thereupon are equal.

10. The hydrodynamic torque converter as recited in claim 5, wherein the tabs (26, 54) are formed integrally from a respective component.

11. The hydrodynamic torque converter as recited in claim 1, further comprising:
a compound structure including the turbine wheel (30) fastened to the pendulum flange (52) and the output hub (18) by means of a first spacing bolt (58), wherein the damper output part (22) is at an axial distance from the compound structure and is connected thereto by means of a second spacing bolt (72).

12. A hydrodynamic torque converter comprising:
a torque converter lockup clutch;
a converter housing connected at a drive side;
a pump wheel non-rotatably connected to the converter housing;
an output hub;
a turbine wheel non-rotatably connected at an output side to the output hub; and,
a torsional vibration damper arranged between a clutch output of the torque converter lockup clutch and the output hub, and including an output part and a centrifugal pendulum device with:
a pendulum flange axially located between the torsional vibration damper and the turbine wheel and non-rotatably connected to the turbine wheel; and
a plurality of pendulum masses connected to the pendulum flange such that the plurality of pendulum masses is displaceable with respect to the pendulum flange, wherein:
the pendulum flange includes a first plurality of tabs extending toward an axis of rotation for the torque converter;
the output part includes a second plurality of tabs extending toward the axis of rotation;
respective tabs from the first plurality of tabs alternate with respective tabs from the second plurality of tabs in a circumferential direction;
the pendulum flange is non-rotatably connected to the turbine wheel and the output hub by respective first fasteners passing through the first plurality of radially inwardly extending tabs; and, the output part is non-rotatably connected to the turbine wheel and the output hub by respective second fasteners passing through the second plurality of radially inwardly extending tabs.

13. A hydrodynamic torque converter comprising:
a torque converter lockup clutch;
a converter housing;
a pump wheel non-rotatably connected to the converter housing;
an output hub;
a turbine wheel non-rotatably connected to the output hub;
a torsional vibration damper including:
   an input part connected to the lockup clutch;
   an intermediate flange;
   at least one first energy storage element engaged with the input part and the intermediate flange;
   an output part including first and second disk parts; and,
   at least one second energy storage element located radially inward of the at least one first energy storage element and engaged with the intermediate flange and the first and second disk parts; and,
a pendulum device including a pendulum flange axially located between the torsional vibration damper and the turbine wheel and non-rotatably connected to the turbine wheel and the first disk part.

* * * * *